No. 638,952. Patented Dec. 12, 1899.
E. R. BERUDE.
CAR COUPLING.
(Application filed Apr. 12, 1899.)
(No Model.) 3 Sheets—Sheet 1.

Witnesses:
Paul Heinberg.
Paul Seiler.

Inventor:
Emil Richard Berude
by Gerson & Sachse
his Attorneys.

No. 638,952. Patented Dec. 12, 1899.
E. R. BERUDE.
CAR COUPLING.
(Application filed Apr. 12, 1899.)
(No Model.) 3 Sheets—Sheet 2.
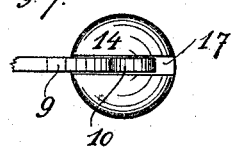
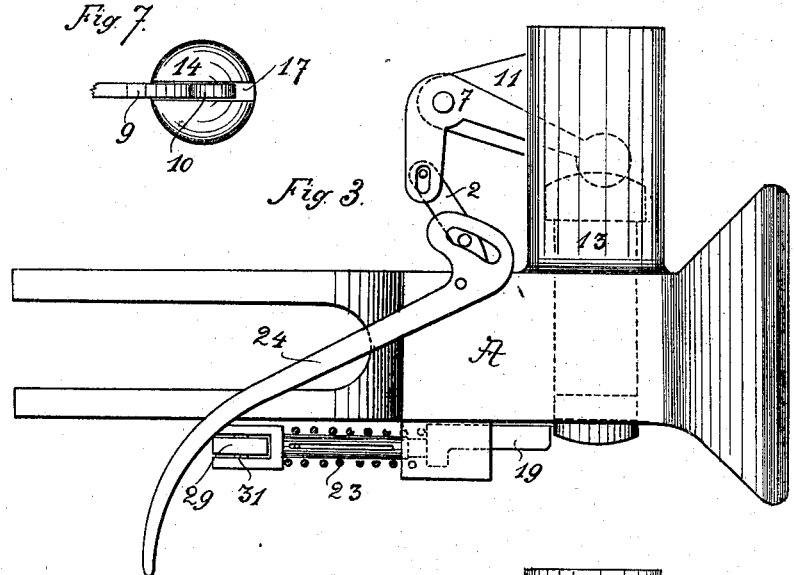
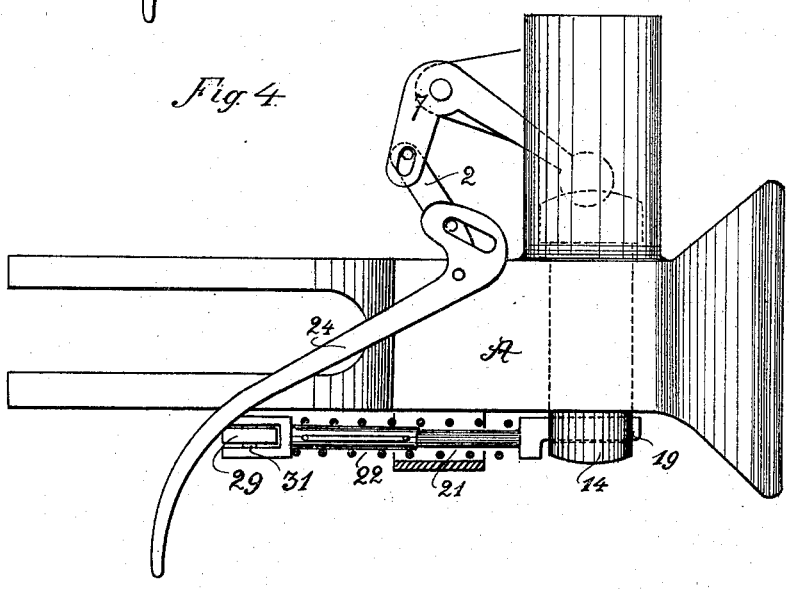
Witnesses:
Paul Keisberg
Paul Seiler
Inventor
Emil Richard Berude
by Gerson & Sachs
his Attorneys.

No. 638,952. Patented Dec. 12, 1899.
E. R. BERUDE.
CAR COUPLING.
(Application filed Apr. 12, 1899.)
(No Model.) 3 Sheets—Sheet 3.
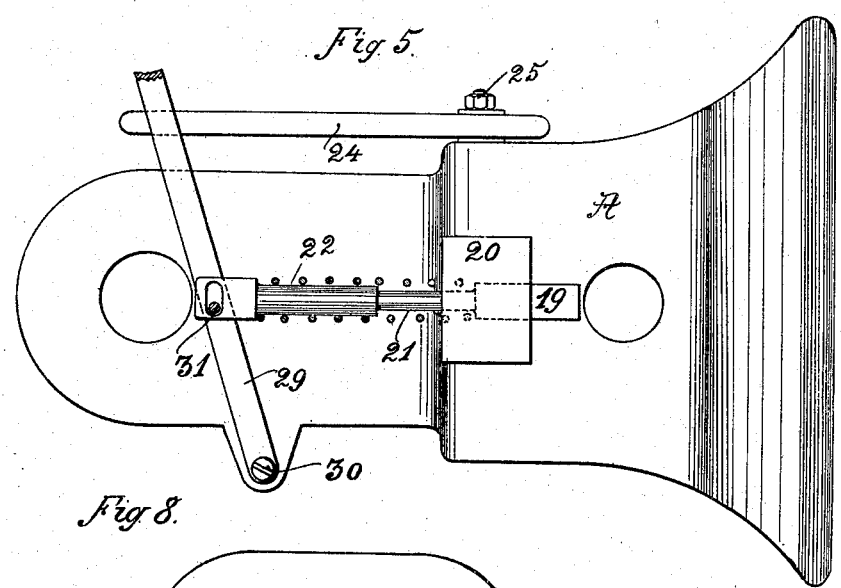
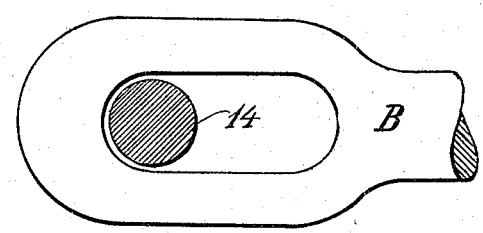
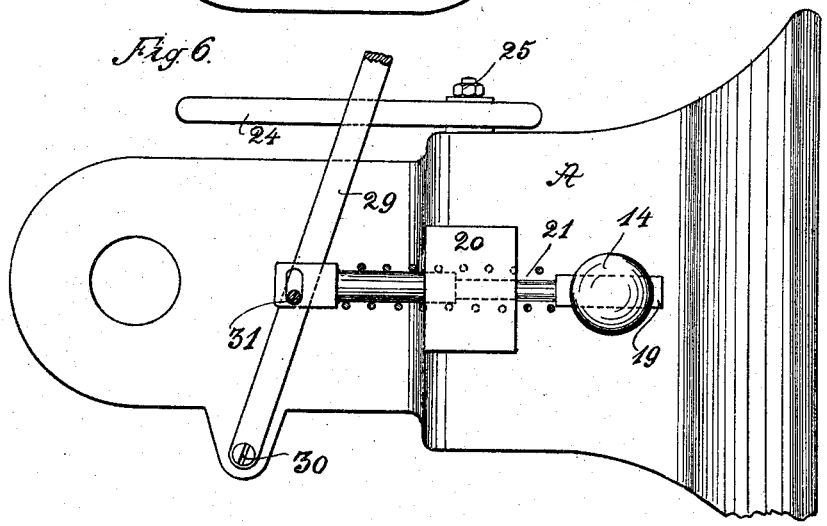
Witnesses:
Inventor
Emil Richard Berude
by Gerson & Sachs
his Attorneys.

UNITED STATES PATENT OFFICE.

EMIL RICHARD BERUDE, OF DRESDEN-BLASEWITZ, GERMANY.

CAR-COUPLING.

SPECIFICATION forming part of Letters Patent No. 638,952, dated December 12, 1899.

Application filed April 12, 1899. Serial No. 712,831. (No model.)

*To all whom it may concern:*

Be it known that I, EMIL RICHARD BERUDE, a subject of the King of Prussia, German Emperor, residing at 6 Hainstrasse, Dresden-Blasewitz, Germany, have invented certain new and useful Improvements in Car-Couplings, of which the following is a specification.

The invention has reference to a coupling for coupling cars, gun-limbers to the guns, and the like, and relates more especially to that class of couplings which couple automatically when the two objects provided with the coupling parts are pushed together; and it consists in the construction and arrangement of parts, as will be hereinafter fully described, reference being had to the accompanying sheets of drawings, of which—

Figure 1:
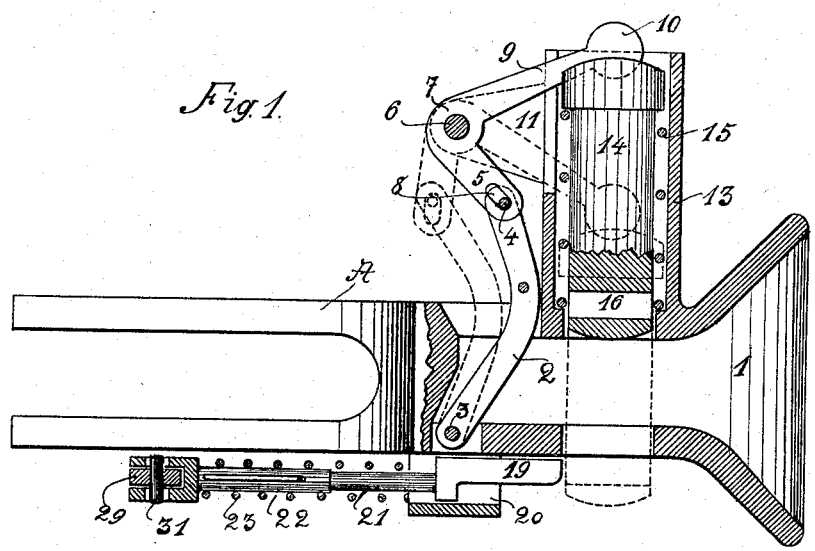
Figure 2:
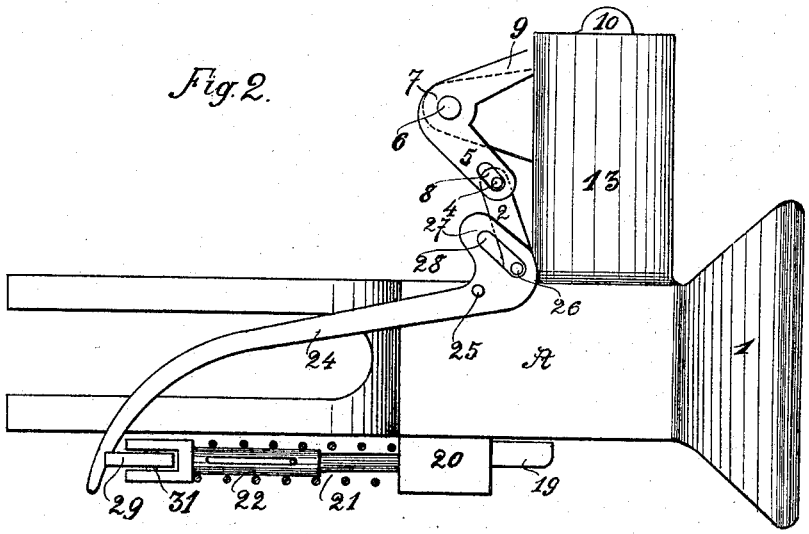

Figure 1 shows a side view, in partly-sectional elevation, of the coupling part carrying the coupling mechanism, hereinafter called coupling part A. Figs. 2, 3, and 4 show this coupling part in side elevation in different coupling and locking stages. Figs. 5 and 6 show two views from below in different coupling and locking stages. Fig. 7 is a plan view of the coupling-bolt, with part of the rocking lever. Fig. 8 represents a plan view of the front end of the coupling part B or eyebolt, with the coupling bolt or pintle in section.

The coupling is composed of two parts A and B, the one engaging the other one during the coupling process. The one part—for instance, the part A—contains the mechanism for lifting and lowering the coupling bolt or pintle and for securing it in the lowermost—*i. e.*, the coupling—position, and the other part B consists of an eyebolt, which when introduced into the part A actuates the coupling mechanism in such a way as to cause the coupling-bolt to descend and pass through the slot in the eyebolt, thus effecting the coupling connection. Both coupling parts are easily attachable and detachable to the respective car ends or gun and limber ends, and it is obvious that always one coupling part A is secured to a car end opposite to a coupling part B, arranged upon the facing car end.

The coupling part A is box-shaped at its front end and carries a funnel-shaped intake 1 for guiding the entering part B. At the inner end of the hollow of the part A a curved lever 2 is pivoted at 3 and carries near its upwardly-projecting end a pin 4, which is guided in a slot 8, provided in the short arm 5 of the bell-crank lever 7, turning on the pivot 6. The long arm 9 of this bell-crank lever is disk-shaped at its front end, as at 10. The pivot 6 is carried by the flap 11, secured to a cylindrical hollow guide-piece 13, which communicates with the hollow of the part A. Within this guide-piece 13 the coupling bolt or pintle 14 is slidingly arranged, resting upon the helical spring 15 and having a transverse groove 17 provided in its head, as shown by Fig. 7, for receiving the disk-shaped bell-crank head 10. In the lower end of the said pintle 14 a transverse slot 16 is provided, the object of which will hereinafter be set forth. Upon the coupling part B being introduced into the hollow of the coupling part A it will press against the lever 2 and cause it to swing backwardly about its pivot 3, thereby causing the bell-crank lever to swing into the position shown in dotted lines in Fig. 1, when the coupling bolt or pintle 14 will be pushed downward transversely through the hollow in the part A and through the slot in the eyebolt (coupling part B) and prevent the latter from being withdrawn again. To securely lock the pintle in this position and prevent it from ascending again when the pressure upon the lever 2 is removed, a locking device is arranged upon the under face of the coupling parts A. It consists of the bolt 19, forming the front end of a bar 21, slidingly arranged within the tube 22, the end of which is ⌐-shaped and is provided with slots 32 for receiving and guiding the pin ends 31, secured in the lever 29, pivoted to the part A, as at 30. A helical spring is adapted to ordinarily keep the parts in the position shown in Figs. 1 and 8. To the side of the part A a double lever 24 is pivotally secured, in the upper shorter arm 27 of which a slot 28 is provided, surrounding and guiding the pin 26, fast upon the lever 2. Upon the coupling parts being pushed together and coupled, as before described, the pin 26 glides, during the first part of the movement of the lever 2, within the slot 28; but during the latter part of the backward swing movement of the lever 2 it causes the lever 24 to swing about its pivot 25, thereby pressing against the lever 29 and causing the tube 22 to slide over the rod 21, the point of the locking-bolt 19 bearing against the lower end of the descending pintle, as is shown in Fig. 3. The spring 23 is then compressed. Upon the pintle descending further until the transverse slot 16 is brought below the under face of part A the locking-bolt 19 is caused to spring forward into the said slot 16, Fig. 4, thereby locking the pintle in its coupling position and preventing it from being inadvertently lifted again. For uncoupling the parts A and B the lever 29 is swung back again, thereby withdrawing the bolt 19 from out of the transverse slot 16 in the pintle and allowing it to be lifted by the spring 15.

What I claim, and desire to secure by Letters Patent, is—

1. In an automatic car-coupling the combination of a coupling part having a hollowed-out front end and a funnel-shaped intake, a coupling bolt or pintle resting upon a helical spring within a cylindrical guide-piece, as means for lowering and lifting the said pintle transversely across the said intake and the said hollow and a coupling-eyebolt, secured opposite the said intake to the facing car end, substantially as set forth.

2. In an automatic car-coupling the combination of a coupling part secured to the car end and having a hollowed-out front end and a funnel-shaped intake, a coupling bolt or pintle resting upon a helical spring within a hollow, cylindrical guide-piece, as means for lowering and lifting the said pintle transversely across the said intake and the said hollow and means for automatically securing the said coupling-bolt in its coupling position, as set forth.

3. In an automatic car-coupling the combination of a coupling part having a hollowed-out front end and a funnel-shaped intake, a lever pivoted at its lower end within the said hollow, extending upwardly and adapted to swing backward upon the other coupling part pushing against it, a bell-crank lever connected with one end to the upper end of the said upwardly-extending lever by means of a pin and a slot and pivoted to a flap secured to the cylindrical hollow guide-piece for the coupling-bolt, said bolt resting upon a helical spring and having a transverse groove in its head for receiving the disk-shaped free end of the said bell-crank lever, as and for the purpose set forth.

4. In an automatic car-coupling the combination of a coupling part having a hollowed-out front end and a funnel-shaped intake, a lever pivoted at its lower end within the said hollow, extending upwardly and adapted to swing backward upon the other coupling part pushing against it, a bell-crank lever connected with one end to the upper end of the said upwardly-extending lever by means of a pin and a slot and pivoted to a flap secured to the cylindrical hollow guide-piece for the coupling-bolt, said bolt resting upon a helical spring and having a transverse groove in its head for receiving the disk-shaped free end of the said bell-crank lever and a transverse slot in its lower end, a locking-bolt to engage the said transverse slot, said locking-bolt forming the front end of a rod, slidingly arranged within a tube, a helical spring interposed between the outer ends of the said rod and tube and a lever pivotally and yieldingly secured to the outer end of the said tube, a pivoted lever being actuated during the last part of the swing movement of the said upwardly-extending lever and actuating the said lever pivoted to the outer end of the tube, the parts being constructed arranged and working substantially as shown and described.

EMIL RICHARD BERUDE.

Witnesses:
  HERNANDO DE SOTO,
  FRANZ WEIDL.